United States Patent
Jeon et al.

(10) Patent No.: US 9,056,972 B2
(45) Date of Patent: Jun. 16, 2015

(54) VINYLIDENE CHLORIDE INTERPOLYMER AND POLY(BUTYLENE SUCCINATE) BLEND

(75) Inventors: Hyun K. Jeon, Rosharon, TX (US); Douglas E. Beyer, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/343,249

(22) PCT Filed: Sep. 12, 2012

(86) PCT No.: PCT/US2012/054895
§ 371 (c)(1), (2), (4) Date: Mar. 6, 2014

(87) PCT Pub. No.: WO2013/048738
PCT Pub. Date: Apr. 4, 2013

(65) Prior Publication Data
US 2014/0221555 A1    Aug. 7, 2014

Related U.S. Application Data

(60) Provisional application No. 61/539,263, filed on Sep. 26, 2011.

(51) Int. Cl.
*C08L 27/08* (2006.01)
*C08L 67/02* (2006.01)
*C08J 5/18* (2006.01)

(52) U.S. Cl.
CPC .. *C08L 27/08* (2013.01); *C08J 5/18* (2013.01); *C08J 2467/02* (2013.01); *C08J 2367/02* (2013.01); *C08J 2427/08* (2013.01)

(58) Field of Classification Search
CPC ................................. C08L 27/08; C08L 67/02
USPC .......................................... 525/416, 437, 539
See application file for complete search history.

(56) References Cited

U.S. PATENT DOCUMENTS

| | | | |
|---|---|---|---|
| 2,968,651 A | 1/1961 | Friedrich, Jr. et al. | |
| 3,007,903 A | 11/1961 | Stark | |
| 3,879,359 A | 4/1975 | Hinkamp et al. | |
| 4,725,651 A * | 2/1988 | Ranck | 525/173 |
| 5,270,390 A | 12/1993 | Shibuya et al. | |
| 6,627,679 B1 | 9/2003 | Kling | |
| 2012/0328806 A1* | 12/2012 | Dewael et al. | 428/35.4 |
| 2014/0221555 A1* | 8/2014 | Jeon et al. | 524/513 |

FOREIGN PATENT DOCUMENTS

| | | | | |
|---|---|---|---|---|
| WO | 2008/028915 A1 | 3/2008 | | |
| WO | 2011/110567 A1 | 9/2011 | | |
| WO | WO 2011/110567 A1 * | 11/2011 | | C08L 27/08 |
| WO | WO 2013/048738 A1 * | 4/2013 | | C08L 27/08 |

OTHER PUBLICATIONS

Lee, J.-C.; Tazawa, H.; Ikehara, T.; Nishi, T. Polym. J. 1998, 30(10), 780-789.*
Nozue et al. Polymer, 2004, 45, 8593-8601.*
Jeong-Chang Lee, et al., Polymer Journal, vol. 30., No. 10, 1998, pp. 780-789.
Kirk-Othmer: Encyclopedia of Chemical Technology, Fourth Edition, vol. 24, 1998, pp. 882-923.

* cited by examiner

*Primary Examiner* — Rip A Lee
(74) *Attorney, Agent, or Firm* — Whyte Hirschboeck Dudek S.C.

(57) ABSTRACT

Barrier films made from a composition comprising vinylidene chloride (VDC) interpolymer and poly(butylene succinate) (PBS) exhibit improved tear resistance in both the machine and cross directions without a significant deterioration in oxygen transmission rate as compared to barrier films made under like conditions and from a composition alike in all respects except that the PBS is replaced with additional VDC interpolymer.

14 Claims, No Drawings

VINYLIDENE CHLORIDE INTERPOLYMER AND POLY(BUTYLENE SUCCINATE) BLEND

CROSS REFERENCE TO RELATED APPLICATION

The present application is the national phase of PCT Patent Application No. PCT/US2012/054895 filed Sep. 12, 2012, which claims priority to U.S. Provisional Application No. 61/539,263, filed Sep. 26, 2011, the entire content of which is incorporated by reference herein.

BACKGROUND OF THE INVENTION

1. Field of the Invention

This invention relates to vinylidene chloride (VDC) interpolymers. In one aspect, the invention relates to a blend of a VDC interpolymer and poly(butylene succinate) (PBS) while in another aspect, the invention relates to improved barrier packaging.

2. Description of the Related Art

Vinylidene chloride interpolymers are well known in the art. VDC interpolymers are known for their high barrier to mass transport of atmospheric gases and water vapor. VDC interpolymers are frequently fabricated into mono- and multilayer blown or cast films. However, due to the proximity of the glass transition temperature (Tg) of VDC interpolymer to room temperature (23° C.), these films are susceptible to brittle failure. As such, the improvement in the tear resistance of film made from VDC interpolymer without a significant deterioration in the barrier properties, e.g., oxygen transmission rate (OTR), of the film is of continuing interest to the packaging industry.

U.S. Pat. No. 4,725,651 teaches a polymeric, miscible blend comprising 1 to 80 weight percent (wt %) VDC interpolymer and 20 to 99 wt % of a thermoplastic copolyester resin. The copolyester reins are made from more than one polyhydric alcohol and/or more than one dibasic acid. While the blends of this teaching exhibit physical properties superior to those expected by the rule of mixtures, neither the affinity of the copolyester resin for the VDC interpolymer nor the tear resistance of a film made from the blend is completely satisfactory.

SUMMARY OF THE INVENTION

In one embodiment the invention is a blend consisting essentially of VDC interpolymer and PBS. In one embodiment the invention is a composition comprising a VDC interpolymer and PBS. The tear resistance of a film (in both the machine and cross-directions) made from the blend or composition is improved over the tear resistance of a film made under like conditions and from a blend or composition alike in all aspects except that the PBS of the blend or composition is replaced with additional VDC interpolymer.

In one embodiment the invention is a blend consisting essentially of, based on the weight of the blend:
A. 80 to less than 100 wt % VDC interpolymer; and
B. Greater than zero to 20 wt % PBS.

In one embodiment the invention is a composition comprising, based on the weight of the composition:
A. 80 but less than 100 wt % VDC interpolymer;
B. Greater than zero to 20 wt % PBS; and
C. At least one additive or filler.

In one embodiment the invention is a film made from a composition comprising, based on the weight of the composition:
A. 80 but less than 100 wt % VDC interpolymer;
B. Greater than zero to 20 wt % PBS; and
C. At least one additive or filler.

DETAILED DESCRIPTION OF THE PREFERRED EMBODIMENT

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of the components in the inventive composition, relative amounts of monomer units in the VDC interpolymer and the molecular weights of the VDC interpolymer and PBS.

The term "comprising" is synonymous with "including," "containing," "having" or "characterized by," is inclusive or open-ended, and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition", "formulation" and like terms means a mixture or blend of two or more components. In the context of a mix or blend of materials from which barrier packaging, e.g., film, is made, the composition includes the blend of the invention and any other additives, fillers and the like.

"Film" refers to a sheet, non-woven or woven web or the like or combinations thereof, having length and breadth dimensions and having two major surfaces with a thickness therebetween. A film can be a monolayer film (having only one layer) or a multilayer film (having two or more layers). A film, in most instances, has a thickness of up to about 20 mils ($5 \times 10^{-4}$ m).

"Layer" means a member or component forming all or a fraction of the thickness of a structure in which the component is preferably substantially coextensive with the structure and has a substantially uniform composition.

"Machine direction" refers to the length of a film in the direction in which it is produced, as opposed to "transverse or cross direction" which refers to the width of a film in a direction generally perpendicular to the machine direction.

"Transverse direction", "cross direction" and like terms refer to the width of a film in a direction generally perpendicular to the direction in which it is produced, as opposed to "machine direction" which refers to the length of a film in the direction in which it is produced.

"Barrier" means a property of a film (monolayer or multilayer) measured as permeability of the film to one or more gasses or vapors (for instance, oxygen, water vapor, odor, etc.). "Barrier resin" or "barrier polymer" means a polymer or polymer composition suitable for use in forming a barrier.

"Polymer" means the polymerization product of one or more monomers and is inclusive of homopolymers as well as interpolymers, copolymers, terpolymers, tetrapolymers, and the like and blends and modifications of any of the foregoing, including block, graft, addition or condensation forms of polymers.

"Mer", "mer unit" and like terms means that portion of a polymer derived from a single reactant molecule; for example, a mer unit from ethylene has the general formula —$CH_2CH_2$—.

"Interpolymer" or "copolymer" refers to a polymer that includes mer units derived from at least two reactants (normally monomers) and is inclusive of random, block, segmented, graft, and the like copolymers, as well as terpolymers, tetrapolymers, and trimers and oligomers.

"Molecular weight" is the weight average molecular weight (Mw) in Daltons. It is measured by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° C. for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 μm styrene/divinylbenzene copolymer beads commercially available from Polymer Laboratories under the trade designation PLGel 5μ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (about. 3,000,000 to 2000 Mp)) in conjunction with their elution volumes.

The term "tear resistance" means the force needed to propagate the tear of a notched film sample also known as Elmendorf tear as measured by the procedures of ASTM D-1922.

Vinylidene Chloride (VDC) Interpolymer

Vinylidene chloride interpolymers suitable for use in the present invention typically comprise mer units derived from vinylidene chloride in an amount of at least 50, more typically at least 70, even more typically at least 84, and still more typically at least 90, mole percent.

The vinylidene chloride interpolymers used in the practice of the present invention further comprise mer units derived from one or more mono-ethylenically unsaturated monomers which are copolymerizable with vinylidene chloride. The mer units derived from the one or more mono-ethylenically unsaturated monomers copolymerizable with vinylidene chloride are typically present in an amount of not greater than 50, more typically not greater than 25 and even more typically not greater than 16, and still more typically not greater than 10 mole percent of interpolymer. The mer units derived from the one or more mono-ethylenically unsaturated monomers copolymerizable with vinylidene chloride are typically present in an amount greater than zero, more typically greater than 1, even more typically greater than 2 and still more typically greater than 3, mole percent.

Mono-ethylenically unsaturated monomers suitable for use in the present invention include vinyl chloride, alkyl acrylates, alkyl methacrylates, acrylic acid, methacrylic acid, itaconic acid, acrylonitrile, and methacrylonitrile. The mono-ethylenically unsaturated monomers are typically selected from the group consisting of vinyl chloride, alkyl acrylates and alkyl methacrylates, the alkyl acrylates and alkyl methacrylates having from 1 to 8 carbon atoms per alkyl group. The alkyl acrylates and alkyl methacrylates typically have from 1 to 4 carbon atoms per alkyl group. The alkyl acrylates and alkyl methacrylates are preferably selected from the group consisting of the methyl acrylates, ethyl acrylates, and methyl methacrylates.

The weight average molecular weight (Mw) of the vinylidene chloride interpolymers used in the practice of this invention are typically of 50,000 to 250,000 Daltons, more typically of 70,000 to 130,000 Daltons as measured by size exclusion chromatography using polystyrene calibration.

Methods of forming the vinylidene chloride interpolymer suitable for use in the present invention are well-known in the art. Vinylidene chloride monomer and one or more mono-ethylenically unsaturated monomers are combined by polymerization, preferably emulsion or suspension polymerization. The process includes at least a step of (a) contacting a composition comprising vinylidene chloride monomer and at least one mono-ethylenically unsaturated monomer, and (b) exposing them to conditions effective for polymerization. The polymerization is within the skill in the art such as taught by U.S. Pat. Nos. 2,968,651, 3,007,903, 3,879,359, and 6,627,679 and "Vinylidene Chloride Monomer and Polymers" from the Kirk-Othmer: Encyclopedia of Chemical Technology, Fourth Edition, Vol. 24, John Wiley & Sons, Inc., New York, 1997, pp 882-923 with the understanding that specific monomers and monomer compositions necessary to achieve the desired interpolymer are used along with and specific selections of polymerization conditions including; time, temperature, and initiators to achieve the desired molecular weights. The process is typically batch or continuous, preferably batch, and with or without continuous or stepwise addition of monomers.

Poly(Butylene Succinate) (PBS)

Poly(butylene succinate) is the condensation product of 1,4-butanediol and succinic acid, or the condensation product of 1,4-butanediol, succinic acid and one or more other dicarboxylic acids, e.g., adipic acid. The PBS used in the practice of this invention typically has a weight average molecular weight of 40,000 to 1,000,000 Daltons, more typically of 100,000 to 300,000 Daltons as measured by size exclusion chromatography using polystyrene calibration. BION-OLLE™ 1001 manufactured by Showa High Polymer of Japan is an example of a commercially available PBS.

VDC Interpolymer and PBS Blend

The blends of this invention typically consist essentially of 80, more typically greater than 85 but less than 100, wt % VDC interpolymer and 20 or less, typically 15 or less, but greater than zero, wt % PBS. The blends typically consist essentially of at least 2 wt % PBS and not greater than 98 wt % VDC interpolymer.

In one embodiment, the VDC interpolymer and PBS are dry blended with one another using conventional equipment and blending techniques to form a homogeneous or substantially homogeneous mixture or blend. In another embodiment, the PBS is dissolved in a vinylidene chloride monomer mixture (e.g., a mixture comprising vinylidene chloride monomer plus one or more mono-ethylenically unsaturated monomers and, optionally, one or more additives or fillers), and then the monomer mixture is subjected to polymerization conditions such that the VDC interpolymer is formed within a reaction mass comprising the PBS. In another embodiment the VDC interpolymer and PBS are melt blended with one another using conventional equipment and blending techniques to form a homogeneous or substantially homogeneous mixture or blend.

VDC Interpolymer and PBS Composition

In one embodiment the invention is a composition comprising (1) VDC interpolymer, (2) PBS, and (3) one or more additives and/or fillers and/or other polymers or, in other words, the VDC interpolymer and PBS blend with one or more additives, fillers or other polymers. Additive type and amount depends on several factors. One factor is the intended use of the blend. Another factor is the tolerance of the blends for the additive, i.e., how much additive can be added to the blend before adversely affecting the physical properties of the blend to an unacceptable level. Other factors are known to those skilled in the art of polymer formulation and compounding.

Representative additives that can be used in the practice of this invention include, but are not limited to, antioxidants, heat stabilizers (e.g., epoxidized soybean or linseed oil), plasticizers (e.g., acetyl tributyl citrate, dibutyl sebacate), light stabilizers, pigments, processing aids, lubricants, acid scavengers, waxes, fillers and the like. Such additives are used in known amounts and in known ways. Typically, additives are used in amounts of less than 10, more typically less than 5 and even more typically less than 3, wt % based upon the weight of the composition.

The compositions of this invention can optionally contain one or more other polymers known to those with skill in the art. Polymer type and amount will depend upon several factors. One such factor is the intended use of the composition. Another factor is compatibility of the polymers, that is, whether the polymers can form a sufficiently homogeneous mixture that does not separate undesirably for the intended purpose. Other factors are apparent to those skilled in the art. In one embodiment, the compositions contain at least two vinylidene chloride interpolymers according to the practice of the invention.

The compositions of the present invention can be used to form a variety of cast, blown, extruded, molded, injection molded, or calendered articles. Films made from the compositions of this invention are useful as packaging and wrapping films and may be monolayer or multilayer films. The films of the present invention can be used alone or laminated to another film or a packaging film component thus forming a package, which contains a product. The films of the present invention are particularly useful for packaging. Oxygen barrier properties are important in film applications such as packaging primal cuts of meat (that is, large cuts of meat which are shipped to a specific store for further cutting for specific consumer consumption). The layer or film comprising the blend or composition of this invention may optionally comprise at most 50, preferably at most 25, more preferably at most 15, most preferably at most 10 wt % of at least one other polymer.

This invention is further illustrated by the following examples. Unless stated otherwise all percentages, parts and ratios are by weight.

SPECIFIC EMBODIMENTS

Comparative Example A

VDC interpolymer of vinylidene chloride and methyl acrylate is prepared from a 4.8 wt % methyl acrylate based resin with the composition as reported in Table 1.

TABLE 1

Composition of Comparative Example A

| Component | Weight Percent |
| --- | --- |
| VDC Interpolymer | 93.23 |
| 50/50 HDPE and high molecular weight silicone$^a$ | 0.15 |
| Paraffin Wax$^b$ | 0.1 |
| Oxidized polyethylene wax$^c$ | 0.1 |
| Stearamide$^d$ | 0.11 |
| Ground Limestone$^e$ | 0.11 |
| Distearyl Thiodipropionate$^f$ | 0.15 |
| Euracamide$^g$ | 0.05 |
| Epoxidized Soybean Oil$^h$ | 4 |
| Dibutyl Sebacate$^i$ | 2 |

$^a$Lubricant; HDPE = High Density Polyethylene.
$^b$Lubricant.
$^c$Lubricant
$^d$Slip Agent
$^e$Antiblock
$^f$Antioxidant/Lubricant
$^g$Lubricant
$^h$Plasticizer
$^i$Plasticizer Components a-g are solids under ambient conditions (23° C. and atmospheric pressure), and are pre-mixed and added as a masterbatch. Components h and i are liquids under ambient conditions and are added during the polymerization process.

The composition is fabricated into a cast film using a 1.75 inch diameter WELEX™ extruder under the conditions reported in Table 2.

TABLE 2

WELEX Extruder Operating Conditions

| Condition | Unit | Measure |
| --- | --- | --- |
| Screw Revolutions | rpm | 30 |
| Extrusion Rate | Lbs/hr | 30 |
| Temperature Barrel Zone 1 | ° C. | 165 |
| Temperature Barrel Zone 2 | ° C. | 175 |
| Temperature Barrel Zone 3 | ° C. | 175 |
| Clamp Temperature | ° C. | 175 |
| Adapter Temperature | ° C. | 175 |

TABLE 2-continued

WELEX Extruder Operating Conditions

| Condition | Unit | Measure |
|---|---|---|
| Steam Die Temperature | ° C. | 165 |
| Winder Nip | rpm | 20 |
| Film Thickness | microns | 150 |

The film is aged for 3 weeks at 23° C. and 50% relative humidity prior to Elmendorf tear test (ASTM D1922). The tear resistance of the film is measured in both of machine direction and transverse (cross) direction and it is 8±1 g/mil and 60±9 g/mil, respectively. Oxygen transmission rate (OTR) of the film is measured at 23° C. and 50% relative humidity according to ASTM D3985 and it is 2.4 cc–mil/(100 in$^2$)/day.

Comparative Example B

The VDC interpolymer of vinylidene chloride and methyl acrylate used in Comparative Example A is first mixed with the additives of Table 1 and then dry-blended with poly(caprolactone) (TONE P767 available from The Dow Chemical Company) into a mixture of 95 wt % VDC interpolymer and 5 wt % poly(caprolactone). The composition is then extruded into a cast film under the same extrusion conditions as used in Comparative Example A. The film is aged under the same conditions and the Elmendorf tear resistances in machine direction and transverse direction are measured at 18±1 g/mil and 86±12 g/mil and OTR is 9.1 cc–mil/(100 in$^2$)/day.

Example 1

Comparative Example B is repeated except that poly(butylene succinate) (BIONOLLE™ 1001 manufactured by Showa High Polymer) is substituted for the poly(caprolactone). The film is aged under the same conditions and the Elmendorf tear resistances in machine direction and transverse direction are measured to be 13±1 g/mil and 74±8 g/mil and OTR is 4.2 cc–mil/(100 in$^2$)/day. The Elmendorf tear resistance of this example is better than that reported in Comparative Example A and although the Elmendorf tear resistance of this example is about the same as that of Comparative Example B, the OTR is twice as good.

What is claimed is:

1. A blend consisting essentially of, based on the weight of the blend:
    A. 80 to less than 100 wt % vinylidene chloride (VDC) interpolymer, wherein the VDC interpolymer comprises mer units derived from one or more of an alkyl acrylate, alkyl methacrylate or acrylonitrile monomer; and
    B. Greater than zero to 15 wt % poly(butylene succinate) (PBS), wherein the PBS has a Mw of 40,000 to 1,000,000 Daltons.

2. The blend of claim 1 comprising 2 to 15 wt % PBS.

3. The blend of claim 1 in which the VDC interpolymer has a Mw of 50,000 to 250,000 Daltons.

4. The blend of claim 1 in which the VDC interpolymer comprises 70 mole percent or more mer units derived from vinylidene chloride monomer.

5. The blend of claim 1 in which the VDC interpolymer consists of mer units derived from vinylidene chloride and methyl acrylate monomers.

6. The blend of claim 1 in which the VDC interpolymer comprises mer units derived from one or more of an alkyl acrylate and alkyl methacrylate selected from the group consisting of methyl acrylates, ethyl acrylates, and methyl methacrylates.

7. A composition comprising, based on the weight of the composition:
    A. 80 to less than 100 wt % VDC interpolymer, wherein the VDC interpolymer comprises mer units derived from one or more of an alkyl acrylate, alkyl methacrylate or acrylonitrile monomer;
    B. Greater than zero to less than 20 wt % PBS, wherein the PBS has a Mw of 40,000 to 1,000,000 Daltons; and
    C. One or more additives.

8. The composition of claim 7 comprising 2 to 15 wt % PBS.

9. The composition of claim 7 in which the VDC interpolymer has a Mw of 40,000 to 250,000 Daltons.

10. The composition of claim 7 in which the VDC interpolymer comprises 70 mole percent or more mer units derived from vinylidene chloride monomer.

11. The composition of claim 7 in which the VDC interpolymer consists of mer units derived from vinylidene chloride and methyl acrylate monomers.

12. The composition of claim 7 in which the VDC interpolymer comprises mer units derived from one or more of an alkyl acrylate and alkyl methacrylate selected from the group consisting of methyl acrylates, ethyl acrylates, and methyl methacrylates.

13. The composition of claim 7 in which the additive is one or more of an antioxidant, heat stabilizer, plasticizer, light stabilizer, pigment, processing aid, lubricant, acid scavenger, filler and wax.

14. A film made from the composition of claim 7.

* * * * *